| (12) | United States Patent<br>Taïeb et al. | (10) Patent No.: US 12,462,844 B1<br>(45) Date of Patent: Nov. 4, 2025 |
|---|---|---|

(54) SYSTEMS AND METHODS FOR GENERATING TIME-SPLIT VIDEOS

(71) Applicant: GoPro, Inc., San Mateo, CA (US)

(72) Inventors: Yoël Taïeb, Paris (FR); Joseph Pinkasfeld, San Mateo, CA (US); Sandra Vitorino, Antony (FR); Guillaume Abbe, Paris (FR); Violaine Sudret, Paris (FR)

(73) Assignee: GoPro, Inc., San Mateo, CA (US)

( * ) Notice: Subject to any disclaimer, the term of this patent is extended or adjusted under 35 U.S.C. 154(b) by 24 days.

(21) Appl. No.: 18/602,964

(22) Filed: Mar. 12, 2024

(51) Int. Cl.
 *G11B 27/00* (2006.01)
 *H04N 5/262* (2006.01)
 *G11B 27/02* (2006.01)

(52) U.S. Cl.
 CPC ......... *G11B 27/007* (2013.01); *H04N 5/2624* (2013.01)

(58) Field of Classification Search
 CPC ....... G11B 27/00; G11B 27/007; G11B 27/02; H04N 5/2624; H04N 5/262
 USPC ................ 386/278, 280, 282, 239
 See application file for complete search history.

(56) References Cited

U.S. PATENT DOCUMENTS 10,062,415 B2 * 8/2018 Eppolito ................ G11B 27/10
11,887,629 B2 * 1/2024 Walker .................. G06F 3/0486

* cited by examiner

*Primary Examiner* — Daquan Zhao
(74) *Attorney, Agent, or Firm* — Esplin & Associates, PC (57) ABSTRACT

A time-split video is generated from a video to provide a simultaneous view of different spatial portions of video at different moments. The time-split video is generated to include multiple time-split video panes. The multiple time-split video panes cover different spatial portions of the video. Different time-changes for the multiple time-split video panes causes the time-split video to show different temporal parts of the video at the same time.

20 Claims, 6 Drawing Sheets

| 302 | 304 | 306 | 308 |
|---|---|---|---|
| 5s Delay | 0s Delay | 5s Ahead | 10s Ahead |
| 0:55 | 1:00 | 1: 05 | 1:10 |

| 302 | 304 | 306 | 308 |
|---|---|---|---|
| 0.5x Speed | 1x Speed | 2x Speed | 4x Speed |
| 0:30 | 1:00 | 2:00 | 4:00 |

SYSTEMS AND METHODS FOR GENERATING TIME-SPLIT VIDEOS

FIELD

This disclosure relates to generating time-split videos.

BACKGROUND

Splitting a view of a video to show different temporal parts of the video at once may create an interviewing view. Such temporal splitting of the video may be difficult and time consuming.

SUMMARY

This disclosure relates to generating time-split videos. Video information, time-split pane information, time-split change information, and/or other information may be obtained. The video information may define a video. The video may have a progress length. The video may include visual content viewable as a function of progress through the progress length of the video. The time-split pane information may define a number of time-split video panes to be included in a time-split video. Individual time-split video panes may cover a spatial portion of the visual content. A first time-split video pane may cover a first spatial portion of the visual content, a second time-split video pane may cover a second spatial portion of the visual content different from the first spatial portion of the visual content, and/or other time-split video panes may cover other spatial portions of the visual content. The time-split change information may define time-changes for the time-split video panes. The time-changes for the time-split video panes may include a first time-change for the first time-split video pane, a second time-change for the second time-split video pane, and/or other time-changes for other time-split video panes.

The time-split video may be generated from the video. The time-split video may include the number of time-split video panes defined by the time-split pane information. The time-split video panes of the time-split video may provide simultaneous views of different spatial portions of the visual content at different moments within the progress length of the video based on the time-changes for the time spilt video panes and/or other information. The first time-split video pane and the second time-split video pane of the time-split video may provide simultaneous views of the first spatial portion of the visual content and the second spatial portion of the visual content at different moments within the progress length based on the first time-change for the first time-split video pane, the second time-change for the second time-split video pane, and/or other information.

A system for generating time-split videos may include one or more electronic storages, one or more processors, and/or other components. An electronic storage may store video information, information relating to a video, information relating to visual content, framing information, time-split pane information, information relating to time-split video panes, information relating to number of time-split video panes, information relating to spatial portions of the visual content covered by time-split video panes, time-split change information, information relating to time-changes for time-split video panes, information relating to time-split videos, and/or other information.

The processor(s) may be configured by machine-readable instructions. Executing the machine-readable instructions may cause the processor(s) to facilitate generating time-split videos. The machine-readable instructions may include one or more computer program components. The computer program components may include one or more of a video component, a time-split pane component, a time-split change component, a time-split video component, and/or other computer program components.

The video component may be configured to obtain video information and/or other information. The video information may define a video. The video may have a progress length. The video may include visual content viewable as a function of progress through the progress length of the video. In some implementations, the video may include a time-lapse video.

The time-split pane component may be configured to obtain time-split pane information and/or other information. The time-split pane information may define a number of time-split video panes to be included in a time-split video. Individual time-split video panes may cover a spatial portion of the visual content. A first time-split video pane may cover a first spatial portion of the visual content, a second time-split video pane may cover a second spatial portion of the visual content different from the first spatial portion of the visual content, and/or other time-split video panes may cover other spatial portions of the visual content. In some implementations, the number of time-split video panes may be defined by a user.

In some implementations, the time-split video panes may include vertical panes and/or horizontal panes. In some implementations, the time-split video panes may include concentric panes.

The time-split change component may be configured to obtain time-split change information and/or other information. The time-split change information may define time-changes for the time-split video panes. The time-changes for the time-split video panes may include a first time-change for the first time-split video pane, a second time-change for the second time-split video pane, and/or other time-changes for other time-split video panes. In some implementations, the time-changes for the time-split video panes may be defined by a user.

In some implementations, a time-change for a time-split video pane may include a time-delay for a spatial portion of the visual content covered by the time-split video pane. In some implementations, prior to the passage of the time-delay, the time-split video pane may provide a frozen view of the spatial portion of the visual content covered by the time-split video pane. In some implementations, prior to the passage of the time-delay, the time-split video pane may provide a dynamic repeating view of the spatial portion of the visual content covered by the time-split video pane.

In some implementations, a view of a spatial portion of the visual content provided by a time-split video pane may include a looping playback of the spatial portion of the visual content covered by the time-split video pane.

The time-split video component may be configured to generate the time-split video from the video. The time-split video may include the number of time-split video panes defined by the time-split pane information. The time-split video panes of the time-split video may provide simultaneous views of different spatial portions of the visual content at different moments within the progress length of the video based on the time-changes for the time spilt video panes and/or other information. The first time-split video pane and the second time-split video pane of the time-split video may provide simultaneous views of the first spatial portion of the visual content and the second spatial portion of the visual content at different moments within the progress length based on the first time-change for the first time-split video pane, the second time-change for the second time-split video pane, and/or other information.

In some implementations, the time-split video panes of the time-split video may provide simultaneous time-lapse views of the different spatial portions of the visual content at different moments within the progress length.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
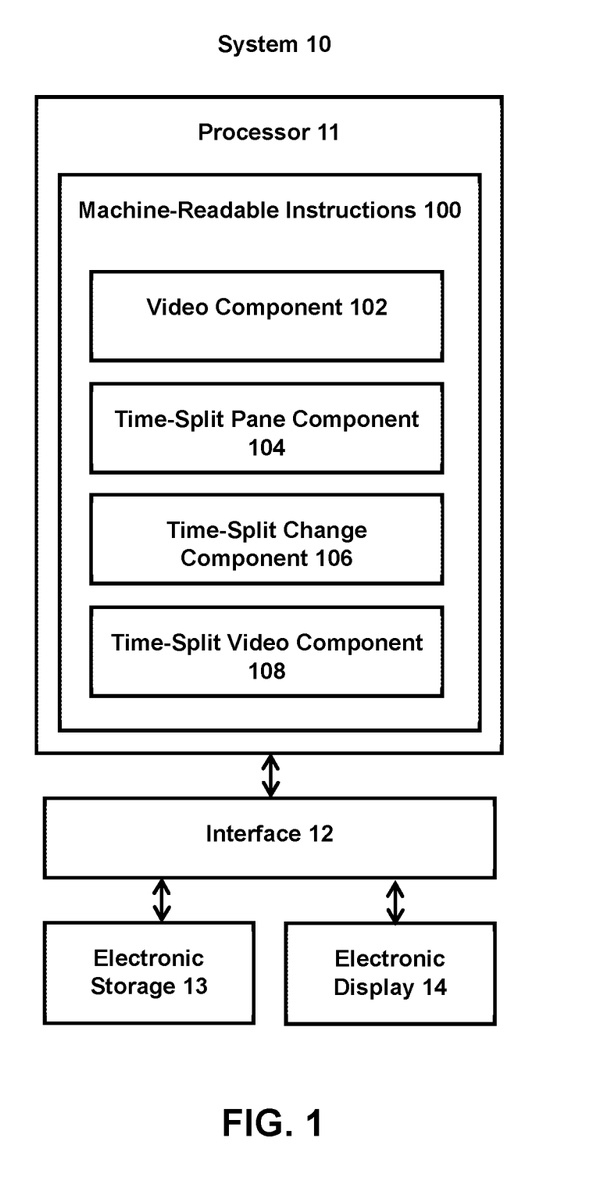
FIG. 1 illustrates an example system for generating time-split videos.

FIG. 1 illustrates a system 10 for generating time-split videos. The system 10 may include one or more of a processor 11, an interface 12 (e.g., bus, wireless interface), an electronic storage 13, an electronic display 14, and/or other components. Video information, time-split pane information, time-split change information, and/or other information may be obtained by the processor 11. The video information may define a video. The video may have a progress length. The video may include visual content viewable as a function of progress through the progress length of the video. The time-split pane information may define a number of time-split video panes to be included in a time-split video. Individual time-split video panes may cover a spatial portion of the visual content. A first time-split video pane may cover a first spatial portion of the visual content, a second time-split video pane may cover a second spatial portion of the visual content different from the first spatial portion of the visual content, and/or other time-split video panes may cover other spatial portions of the visual content. The time-split change information may define time-changes for the time-split video panes. The time-changes for the time-split video panes may include a first time-change for the first time-split video pane, a second time-change for the second time-split video pane, and/or other time-changes for other time-split video panes.

The time-split video may be generated from the video by the processor 11. The time-split video may include the number of time-split video panes defined by the time-split pane information. The time-split video panes of the time-split video may provide simultaneous views of different spatial portions of the visual content at different moments within the progress length of the video based on the time-changes for the time spilt video panes and/or other information. The first time-split video pane and the second time-split video pane of the time-split video may provide simultaneous views of the first spatial portion of the visual content and the second spatial portion of the visual content at different moments within the progress length based on the first time-change for the first time-split video pane, the second time-change for the second time-split video pane, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, framing information, time-split pane information, information relating to time-split video panes, information relating to number of time-split video panes, information relating to spatial portions of the visual content covered by time-split video panes, time-split change information, information relating to time-changes for time-split video panes, information relating to time-split videos, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, framing information, time-split pane information, information relating to time-split video panes, information relating to number of time-split video panes, information relating to spatial portions of the visual content covered by time-split video panes, time-split change information, information relating to time-changes for time-split video panes, information relating to time-split videos, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually.

For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

The present disclosure enables generation of time-split videos. A time-split video may refer to a video that provides a simultaneous view of different spatial portions of visual content corresponding to different moments. Rather than showing the visual content captured at the same time together, a time-split video may show visual content captured at different times. A time-split video may include a playback of another video to shows different temporal parts of the other video at once and/or an encoded video in which the video frames include different temporal parts of the other video at once.

Figure 3A:
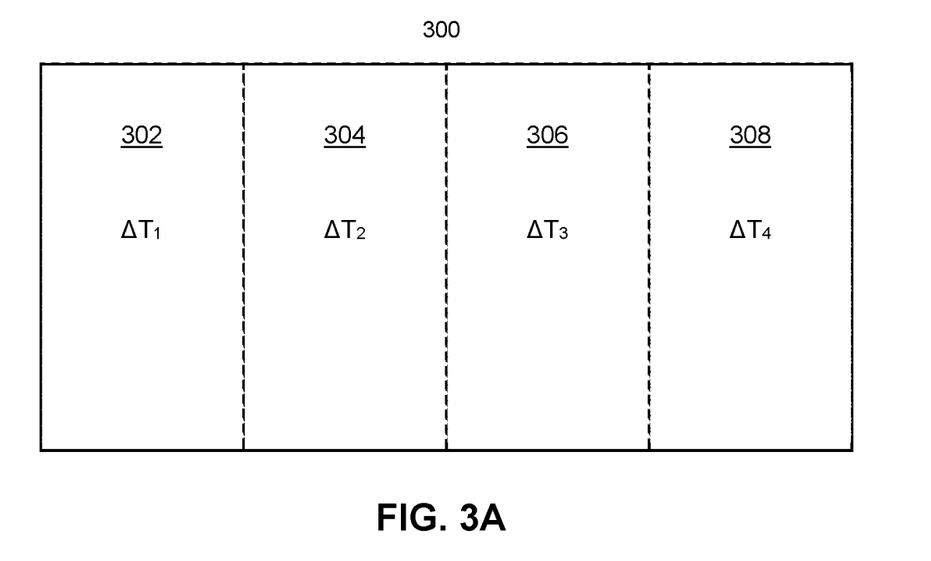
FIG. 3A illustrates example time-split video panes in a time-split video.

FIG. 3A illustrates an example time-split video 300. The time-split video 300 may include time-split video panes 302, 304, 306, 308. A time-split video pane may refer to a discrete area that covers a spatial portion of the visual content. A time-split video pane may refer to a discrete area that covers a spatial extent of the field of view of the visual content. Individual time-split video panes 302, 304, 306, 308 may cover different spatial portions of the visual content from which the time-split video 300 is generated. Individual time-split video panes 302, 304, 306, 308 may show different spatial portions of the visual content. For example, the time-split video pane 302 may cover/show the left portion of the visual content, the time-spit video pane 304 may cover/show the middle-left portion of the visual content, the time-spit video pane 306 may cover/show the middle-right portion of the visual content, and the time-spit video pane 308 may cover/show the right portion of the visual content.

Individual time-split video panes 302, 304, 306, 308 may be associated with different time-changes. A time-change may refer to a temporal change in playback of the visual content covered by a time-split video pane. A time-change of a time-split video pane may include a change in when playback is started for the time-split video pane, a change in speed of playback for the time-split video pane, a change in direction of playback for the time-split video pane, and/or other types of time-changes. For example, a time-change of a time-split video pane may include a time-delay (e.g., positive or negative time-delay), a time-advance (e.g., positive or negative time-advance), a speed-up (e.g., greater than 1× speed of playback), a speed-down (e.g., less than 1× speed of playback), a forward-direction playback, and/or a reverse-direction playback for the spatial portion of the visual content covered by the time-split video pane.

Different time-split video panes 302, 304, 306, 308 may have different time-changes, which results in the time-split video 300 simultaneously showing different temporal parts of the visual content at once. For example, the time-split video pane 302 may have a time change $\Delta T_1$, the time-split video pane 304 may have a time change $\Delta T_2$, the time-split video pane 306 may have a time change $\Delta T_3$, and the time-split video pane 308 may have a time change $\Delta T_4$, with the time-changes $\Delta T_1$, $\Delta T_2$, $\Delta T_3$, $\Delta T_4$ being different from each other.

Figure 3B:
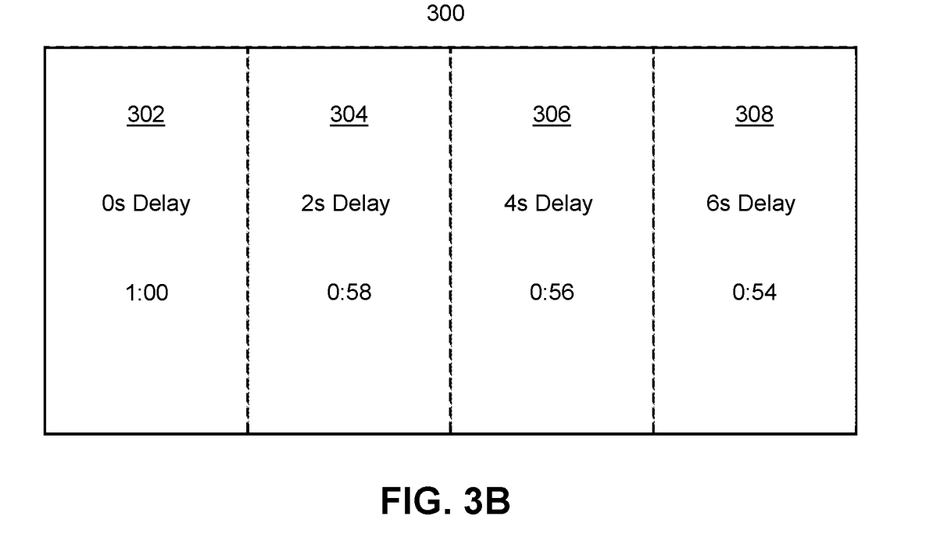
FIG. 3B illustrates example time-split video panes in a time-split video.
Figure 3C:
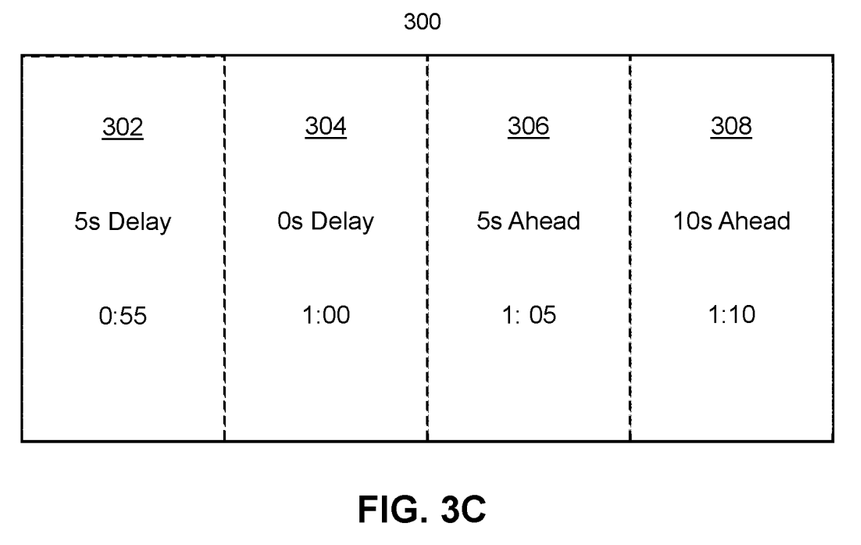
FIG. 3C illustrates example time-split video panes in a time-split video.
Figure 3D:
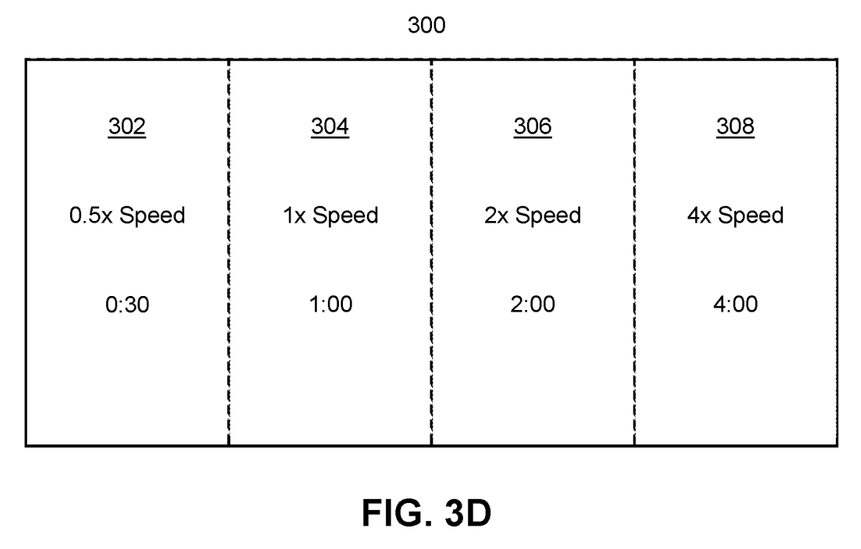
FIG. 3D illustrates example time-split video panes in a time-split video.

FIGS. 3B, 3C, and 3D illustrate example time-changes in the time-split video 300. Other time-changes, other types of time-changes, and other combinations of time-changes are contemplated. In FIG. 3B, the time-split video panes 302, 304, 306, 308 may have different time-delays. A time-delay may control when the playback of the visual content covered by a time-split video pane is started. A time-delay may push back the start of playback (e.g., positive time-delay), not change the start of playback (e.g., zero time-delay), or push ahead the start of playback (e.g., negative time-delay). For example, in FIG. 3B, the time-split video pane 302 may have a 0-second time-delay, the time-split video pane 304 may have a 2-second time-delay, the time-split video pane 306 may have a 4-second time-delay, and the time-split video pane 308 may have a 6-second time-delay. The differences in the time-delays of the time-split video panes 302, 304, 306, 308 may cause the time-split video to show different temporal parts of the visual content at once. For example, at 1:00 mark in the playback of the time-split video 300, the time-split video pane 302 may show the left portion of the visual content at 1:00 mark, the time-split video pane 304 may show the middle-left portion of the visual content at 0:58 mark, the time-split video pane 306 may show the middle-right portion of the visual content at 0:56 mark, and the time-split video pane 308 may show the right portion of the visual content at 0:54 mark.

in FIG. 3C, the time-split video pane 302 may have a 5-second time-delay, the time-split video pane 304 may have a 0-second time-delay, the time-split video pane 306 may have a minus 5-second time-delay, and the time-split video pane 308 may have a minus 10-second time-delay. The differences in the time-delays of the time-split video panes 302, 304, 306, 308 may cause the time-split video to show different temporal parts of the visual content at once. For example, at 1:00 mark in the playback of the time-split video 300, the time-split video pane 302 may show the left portion of the visual content at 0:55 mark, the time-split video pane 304 may show the middle-left portion of the visual content at 1:00 mark, the time-split video pane 306 may show the middle-right portion of the visual content at 1:05 mark, and the time-split video pane 308 may show the right portion of the visual content at 1:10 mark.

In FIG. 3D, the time-split video pane 302 may have a speed-down of 0.5×, the time-split video pane 304 may have a regular speed of 1×, the time-split video pane 306 may have a speed-up of 2×, and the time-split video pane 308 may have a speed-up of 4×. The differences in the time-delays of the time-split video panes 302, 304, 306, 308 may cause the time-split video to show different temporal parts of the visual content at once. For example, at 1:00 mark in the playback of the time-split video 300, the time-split video pane 302 may show the left portion of the visual content at 0:30 mark, the time-split video pane 304 may show the middle-left portion of the visual content at 1:00 mark, the time-split video pane 306 may show the middle-right portion of the visual content at 2:00 mark, and the time-split video pane 308 may show the right portion of the visual content at 4:00 mark.

While FIGS. 3B and 3C show time-split video panes with same progressive changes in time-delay (e.g., ⅖ second change per time-split video pane), this is merely as an example and is not meant to be limiting. Time-changes in the time-split video panes may or may not follow a pattern. Whiles FIGS. 3A, 3B, 3C, and 3D show time-split video panes with a single type of time-change, this is merely an example and is not meant to be limiting. A time-split video pane may have multiple times of time-change (e.g., time-delay and speed change).

Time-split video panes of a time-split video may have the same shape or different shapes. Time-split video panes of a time-split video may have polygonal shapes and/or non-polygonal shapes. Time-split video panes of a time-split video may be symmetrically arranged or non-symmetrically arranged.

FIGS. 3A, 4, 5, and 6 illustrate example shapes and arrangements of time-split video panes. Other shapes and arrangements of time-split video panes are contemplated. In FIG. 3A, the time-split video panes 302, 304, 306, 308 of the time-split video 300 may include vertical panes. A vertical pane may refer to a time-spit video pane in which the vertical dimension is larger than the horizontal dimension. The time-split video panes 302, 304, 306, 308 may be laterally arranged to cover different lateral portions of the visual content.

Figure 4:
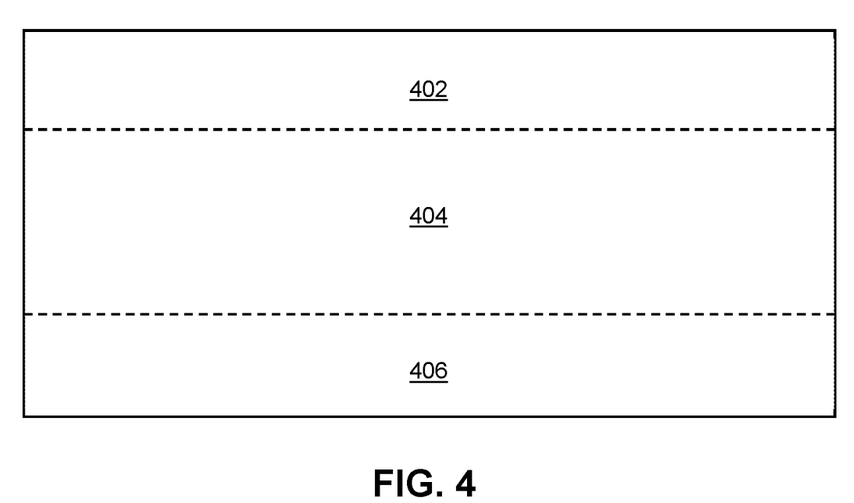
FIG. 4 illustrates example time-split video panes in a time-split video.

In FIG. 4, time-split video panes 402, 404, 406 of a time-split video 400 may include horizontal panes. A horizontal pane may refer to a time-spit video pane in which the horizontal dimension is larger than the vertical dimension. The time-split video panes 402, 404, 406 may be vertically arranged to cover different vertical portions of the visual content.

Figure 5:
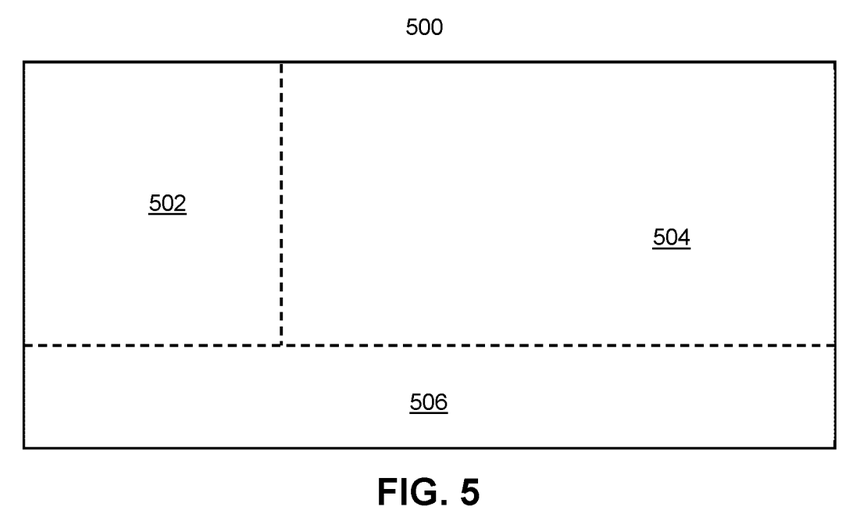
FIG. 5 illustrates example time-split video panes in a time-split video.

In FIG. 5, time-split video panes 502, 504, 506 of a time-split video 500 may include a vertical pane and two horizontal panes. The time-split video panes 502, 504, 506 may be vertically and horizontally arranged to cover different spatial portions of the visual content.

Figure 6:
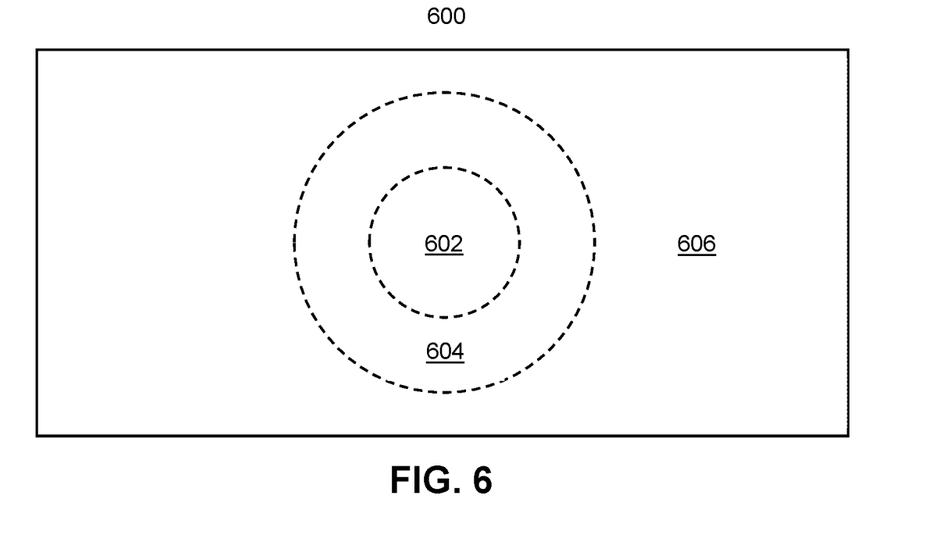
FIG. 6 illustrates example time-split video panes in a time-split video.

In FIG. 6, time-split video panes 502, 504, 506 of a time-split video 500 may include concentric panes. A concentric pane may refer to a pane that share its center with another concentric pane. A concentric pane may have a circular shape, such as shown in FIG. 6, or a non-circular shape. The time-split video panes 502, 504, 506 may be concentrically arranged to cover different spatial portions of the visual content.

Referring back to FIG. 1, the processor 11 (or one or more components of the processor 11) may be configured to obtain information to facilitate generating time-split videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating time-split videos. The machine-readable instructions 100 may include one or more computer program components. The machine-readable instructions 100 may include one or more of a video component 102, a time-split pane component 104, a time-split change component 106, a time-split video component 108, and/or other computer program components.

The video component 102 may be configured to obtain video information and/or other information. In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The video may include visual content viewable as a function of progress through the progress length of the video. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

In some implementations, the video may include a time-lapse video. A time-lapse video may refer to a video in which the rate at which the video frames are captured (capture framerate) is lower than the rate at which the video frames are played (playback framerate). A time-lapse video may refer to a video in which the perceived playback speed of the video is greater than 1× speed.

The visual content may have a field of view. A field of view of a video/visual content may refer to a field of view of a scene captured within the video/visual content (e.g., within video frames). A field of view of a video/visual content may refer to the extent of a scene that is captured within the video/visual content. In some implementations, the field of view of a video/visual content may be greater than or equal to 180-degrees. In some implementations, the field of view of a video/visual content may be smaller than or equal to 180-degrees.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The time-split pane component 104 may be configured to obtain time-split pane information and/or other information. In some implementations, the time-split pane component 104 may obtain time-split pane information for a video based on one or more defaults, one or more settings, and/or one or more configurations. For example, the number of time-split video panes to be included in a time-split video may be set and the set number may be retrieved for the video. In some implementations, the time-split pane component 104 may obtain time-split pane information for a video based on a user's interaction with a user interface/application (e.g., video editing application, video player application), and/or other information. The user interface/application may provide option(s) for a user to set and/or define the number of time-split video panes to be included in a time-split video.

For example, a user interface/application may enable the user to select how many time-split panes should be included in a time-split video. A user interface/application may enable the user to add or remove time-split panes for a video. A user interface/application may enable the user to set or change the shape of time-split panes for a video. A user interface/application may enable the user to set or change the arrangement of the time-split panes for a video.

The time-split pane information may define a number of time-split video panes to be included in a time-split video. The time-split pane information may define how many time-split video panes are to be included in a time-split video. The number of time-split video panes to be included in a time-split video may be defined by a user and/or set based on one or more defaults, one or more settings, and/or one or more configurations. Individual time-split video panes may cover a spatial portion of the visual content. One time-split video pane may cover one spatial portion of the visual content and another time-split video pane may cover a different spatial portion of the visual content. A spatial portion of the visual content may refer to an extent (spatial extent) of the field of view of the visual content. Individual time-split video panes may provide punchouts of different spatial portions of the visual content. A punchout of the visual content may refer to extents of the visual content that is obtained for viewing and/or extraction. The extents of the visual content viewable/extracted within the time-split video panes may be used to provide views of different spatial parts of the visual content at the same time.

The time-split pane information may define the arrangement of time-split video panes to be included in a time-split video. The arrangement of time-split video panes may refer to positions and/or placement of the time-split video panes. The arrangement of time-split video panes may determine which spatial portions of the visual content are covered by which time-split video panes. The arrangement of time-split video panes may include location, shape, size, rotation, and/or other spatial characteristics of the time-split video panes. The arrangement of time-split video panes to be included in a time-split video may be defined by a user and/or set based on one or more defaults, one or more settings, and/or one or more configurations. For example, a user interface may enable a user to set/change location, shape, size, rotation, and/or other spatial characteristics of the time-split video panes.

The time-split pane information may define a number of time-split video panes and the arrangement of the time-split video panes by including information that defines one or more content, qualities, attributes, features, and/or other aspects of the time-split video panes. For example, the time-split pane information may define the number of time-split video panes by including information that specifies the number of time-split video panes and/or information from which the number of time-split video panes may be determined. The time-split pane information may define the arrangement of time-split video panes by including information that specifies the arrangement of time-split video panes and/or information from which the arrangement of time-split video panes may be determined. Other types of time-split pane information are contemplated.

The time-split change component 106 may be configured to obtain time-split change information and/or other information. In some implementations, the time-split change component 106 may obtain time-split change information for a video based on one or more defaults, one or more settings, and/or one or more configurations. For example, the time-changes for the time-split video panes to be included in a time-split video may be set and the set number may be retrieved for the video. In some implementations, the time-split change component 106 may obtain time-split change information for a video based on a user's interaction with a user interface/application (e.g., video editing application, video player application), and/or other information. The user interface/application may provide option(s) for a user to set and/or define the time-changes for the time-split video panes to be included in a time-split video.

For example, a user interface/application may enable the user to select/specify time-changes for the time-split panes to be included in a time-split video. A user interface/application may enable the user to set or change the type(s) of time changes for the time-split panes to be included in a time-split video. A user interface/application may enable the user to set or change time changes for the time-split panes individually or as one or more groups.

The time-split change information may define time-changes for the time-split video panes. The time-split change information may how the playback of the visual content covered by the time-split video panes are to be temporally changed. A temporal change in playback of the visual content covered by a time-split video pane may include a change in when playback is started for the time-split video pane, a change in speed of playback for the time-split video pane, a change in direction of playback for the time-split video pane, and/or other types of time-changes. The time-changes for the time-split video panes may be defined by a user and/or set based on one or more defaults, one or more settings, and/or one or more configurations.

For example, a time-change for a time-split video pane may include a time-delay, a time-advance, a change in playback speed, and/or change in playback direction for a spatial portion of the visual content covered by the time-split video pane. A time-delay may cause delayed playback of the spatial portion of the visual content covered by the time-split video pane. A time-advance may cause early playback of the spatial portion of the visual content covered by the time-split video pane. A change in playback speed may cause speed-up or speed-down in playback of the spatial portion of the visual content covered by the time-split video pane. A change in playback direction may cause the spatial portion of the visual content covered by the time-split video pane to be played in the forward direction (e.g., frame 1, then frame 2, then frame 3) or in the reverse direction (e.g., frame 3, then frame 2, then frame 1).

At least two of the time-split video panes may have different time-changes. One time-split video pane that covers one spatial portion of the visual content may have one time-change and another time-split video pane that covers another spatial portion of the visual content may have different time-changes (a different value of the same type of time change, different types of time change).

The time-split change information may define time-changes for the time-split video panes by including information that defines one or more content, qualities, attributes, features, and/or other aspects of the time-changes for the time-split video panes. For example, the time-split change information may define the time-changes for the time-split video panes by including information that specifies the time-changes for the time-split video panes and/or information from which the time-changes for the time-split video panes may be determined. Other types of time-split change information are contemplated.

In some implementations, prior to the passage of a time-delay for a time-split video pane, the time-split video pane may provide a frozen view of the spatial portion of the visual content covered by the time-split video pane. A time-split video may include a time-spilt video pane with a time-delay, and during playback of the time-split video, the time-split video pane may provide a frozen view of the spatial portion of the visual content covered by the time-split video pane until the time-delay has passed. A frozen view of the visual content may be provided by showing the same visual content depicted within a single video frame until the time-delay has passed. A frozen view of the visual content may be provided by copying the same video frame for playback until the time-delay has passed.

For example, referring to FIG. 3B, the time-split video pane 304 may include a 2-second time delay. During playback of the time-split video 300, the time-split video pane 304 may provide a frozen view of the middle-left portion of the visual content for the first two-seconds of playback (e.g., show copies of the middle-left portion of the first video frame). After the playback has passed two-seconds, the time-split video pane 304 may provide a delayed view of the middle-left portion of the visual content (e.g., start the delayed playback of the middle-left portion of the visual content).

In some implementations, prior to the passage of the time-delay, the time-split video pane may provide a dynamic repeating view of the spatial portion of the visual content covered by the time-split video pane. A time-split video may include a time-spilt video pane with a time-delay, and during playback of the time-split video, the time-split video pane may provide a dynamic repeating view of the spatial portion of the visual content covered by the time-split video pane until the time-delay has passed. A dynamic repeating view of the visual content may be provided by showing loops of the visual content depicted within multiple video frames until the time-delay has passed. A dynamic repeating view of the visual content may be provided by copying a certain number of video frames multiple times for playback until the time-delay has passed.

For example, referring to FIG. 3B, the time-split video pane 304 may include a 2-second time delay. During playback of the time-split video 300, the time-split video pane 304 may provide a dynamic repeating view of the middle-left portion of the visual content for the first two-seconds of playback (e.g., show loops of the first 0.1-second duration of the middle-left portion of the visual content). The amount of the video that is looped during the time-delay may be defined by a user and/or set based on one or more defaults, one or more settings, and/or one or more configurations. After the playback has passed two-seconds, the time-split video pane 304 may provide a delayed view of the middle-left portion of the visual content (e.g., start the delayed playback of the middle-left portion of the visual content).

In some implementations, a view of a spatial portion of the visual content provided by a time-split video pane may include a looping playback of the spatial portion of the visual content covered by the time-split video pane. A looping playback of the visual content may include the playback of the visual content starting from the beginning once the end has been reached. For example, referring to FIG. 3B, the time-split video pane 304 may show the middle-left portion of the visual content, from the beginning to the end of the video. Once the end of the video has been reached, the time-split video pane 304 may start over from the beginning of the video. While the time-split video pane 304 is showing the first two-seconds of the video, the time-split video pane 306 may show the last two-seconds of the video. Once the end of the video has been reached, the time-split video pane 306 may start over from the beginning of the video.

The time-split video component 108 may be configured to generate a time-split video from the video. Generating a time-split video may include creating, displaying, encoding, presenting, storing, and/or otherwise generating the time-split video. The time-split video may be generated from the video by using the video frames of the video. The time-split video may be generated from the video by copying and/or modifying the video frames of the video. The time-split video may be provided (e.g., presented on a display, transmitted to a computing device) for user selection, storage, upload, and/or other operations. In some implementations, the time-split video may be automatically generated from a video after the video has been captured by an image capture device. In some implementations, the time-split video may be generated through an application (e.g., video editing application, video player application).

The time-split video may include the number of time-split video panes defined by the time-split pane information. The time-split video may include the arrangement of time-split video panes defined by the time-split pane information. The time-split video panes of the time-split video may provide simultaneous views of different spatial portions of the visual content at different moments within the progress length of the video based on the time-changes for the time spilt video panes and/or other information. Multiple time-split video panes of the time-split video may provide simultaneous views of different spatial portions of the visual content at different moments within the progress length of the video based on the time-changes for the time-split video panes, and/or other information. If the video is a time-lapse video, the time-split video panes of the time-split video may provide simultaneous time-lapse views of the different spatial portions of the visual content at different moments within the progress length.

In some implementations, the time-split video may be generated from the video by applying the time-changes of the time-split video panes to the video. Different spatial portions for the video may be caused to be played/copied from different moments in the video by applying the time-changes of the time-split video panes to the video and then merged together to generate the time-split video.

In some implementations, the time-split video may be generated from the video by using one or more masks for the visual content. A mask may be created with different values for different time-split video panes. The values of the mask may correspond to different time changes. For example, the values of a greyscale mask may range from 0 to 100, with different values and/or types of time change being applied to the corresponding spatial portions of the visual content. For example, values between 0 and 10 may correspond to a 0-second time delay, values between 11 and 20 may correspond to a 1-second time delay, values between 21 and 30 may correspond to a 2-second time delay, and so forth. The time-split panels and the time-delays for the time-split panels may be determined based on the values of the mask. As another example, a color mask may utilize different color channels for different types of time change and the values within individual color channels for different amounts of time change. For example, a first color channel may specify the values of time delay for corresponding spatial portions of the visual content, a second color channel may specify the values of playback speed for the corresponding spatial portions of the visual content, and a third color channel may specify the values of playback direction for the corresponding spatial portions of the visual content. Other usage of masks is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
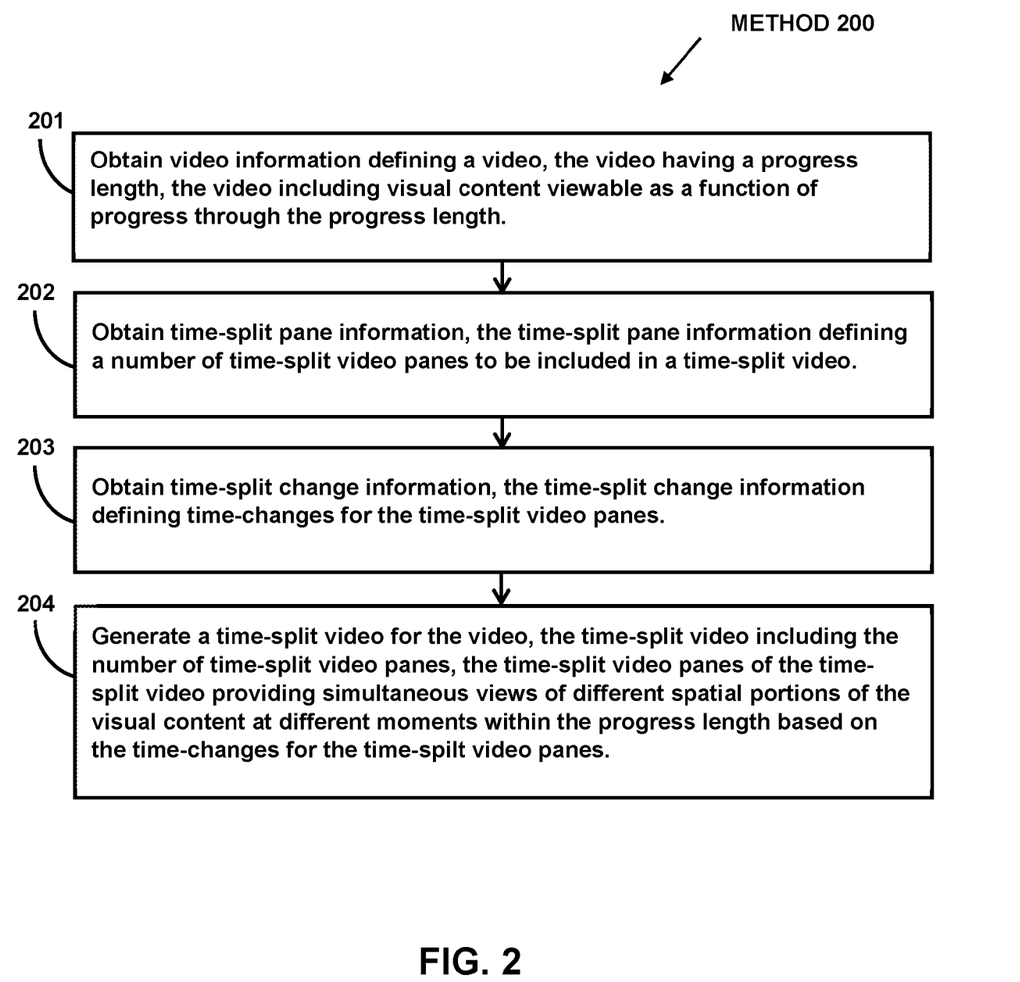
FIG. 2 illustrates an example method for generating time-split videos.

FIG. 2 illustrates method 200 for generating time-split videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length of the video. In some implementations, operation 201 may be performed by a processor component the same as or similar to the video component 102 (Shown in FIG. 1 and described herein).

At operation 202, time-split pane information may be obtained. The time-split pane information may define a number of time-split video panes to be included in a time-split video. Individual time-split video panes may cover a spatial portion of the visual content. A first time-split video pane may cover a first spatial portion of the visual content, a second time-split video pane may cover a second spatial portion of the visual content different from the first spatial portion of the visual content, and/or other time-split video panes may cover other spatial portions of the visual content. In some implementations, operation 202 may be performed by a processor component the same as or similar to the time-split pane component 104 (Shown in FIG. 1 and described herein).

At operation 203, time-split change information may be obtained. The time-split change information may define time-changes for the time-split video panes. The time-changes for the time-split video panes may include a first time-change for the first time-split video pane, a second time-change for the second time-split video pane, and/or other time-changes for other time-split video panes. In some implementations, operation 203 may be performed by a processor component the same as or similar to the time-split change component 106 (Shown in FIG. 1 and described herein).

At operation 204, the time-split video may be generated from the video. The time-split video may include the number of time-split video panes defined by the time-split pane information. The time-split video panes of the time-split video may provide simultaneous views of different spatial portions of the visual content at different moments within the progress length of the video based on the time-changes for the time spilt video panes and/or other information. The first time-split video pane and the second time-split video pane of the time-split video may provide simultaneous views of the first spatial portion of the visual content and the second spatial portion of the visual content at different moments within the progress length based on the first time-change for the first time-split video pane, the second time-change for the second time-split video pane, and/or other information. In some implementations, operation 204 may be performed by a processor component the same as or similar to the time-split video component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating time-split videos, the system comprising:
   one or more physical processors configured by machine-readable instructions to:
      obtain video information defining a video, the video having a progress length, the video including visual content viewable as a function of progress through the progress length;
      obtain time-split pane information, the time-split pane information defining a number of time-split video panes to be included in a time-split video, individual time-split video panes covering a spatial portion of the visual content, wherein a first time-split video pane covers a first spatial portion of the visual content and a second time-split video pane covers a second spatial portion of the visual content different from the first spatial portion of the visual content;
      obtain time-split change information, the time-split change information defining time-changes for the time-split video panes, the time-changes for the time-split video panes including a first time-delay for the first time-split video pane and a second time-delay for the second time-split video pane; and
      generate the time-split video from the video, the time-split video including the number of time-split video panes, the time-split video panes of the time-split video providing simultaneous and looping views of different spatial portions of the visual content at different moments within the progress length based on the time-changes for the time-spilt video panes, the first time-split video pane and the second time-split video pane of the time-split video providing simultaneous and looping views of the first spatial portion of the visual content and the second spatial portion of the visual content at different moments within the progress length based on the first time-delay for the first time-split video pane and the second time-delay for the second time-split video pane.

2. The system of claim 1, wherein prior to the passage of the time-delay, a given time-split video pane provides a frozen view or a dynamic repeating view of a given spatial portion of the visual content covered by the given time-split video pane.

3. The system of claim 1, wherein the time-split video panes include vertical panes and/or horizontal panes.

4. The system of claim 1, wherein the time-split video panes include concentric panes.

5. A system for generating time-split videos, the system comprising:
   one or more physical processors configured by machine-readable instructions to:
      obtain video information defining a video, the video having a progress length, the video including visual content viewable as a function of progress through the progress length;
      obtain time-split pane information, the time-split pane information defining a number of time-split video panes to be included in a time-split video, individual time-split video panes covering a spatial portion of the visual content, wherein a first time-split video pane covers a first spatial portion of the visual content and a second time-split video pane covers a second spatial portion of the visual content different from the first spatial portion of the visual content;
      obtain time-split change information, the time-split change information defining time-changes for the time-split video panes, the time-changes for the time-split video panes including a first time-change for the first time-split video pane and a second time-change for the second time-split video pane, wherein a given time-change for a given time-split video pane includes a time-delay for a given spatial portion of the visual content covered by the given time-split video pane; and
      generate the time-split video from the video, the time-split video including the number of time-split video panes, the time-split video panes of the time-split video providing simultaneous views of different spatial portions of the visual content at different moments within the progress length based on the time-changes for the time-spilt video panes, the first time-split video pane and the second time-split video pane of the time-split video providing simultaneous views of the first spatial portion of the visual content and the second spatial portion of the visual content at different moments within the progress length based on the first time-change for the first time-split video pane and the second time-change for the second time-split video pane.

6. The system of claim 5, wherein prior to the passage of the time-delay, the given time-split video pane provides a frozen view of the given spatial portion of the visual content.

7. The system of claim 5, wherein prior to the passage of the time-delay, the given time-split video pane provides a dynamic repeating view of the given spatial portion of the visual content.

8. The system of claim 5, wherein a given view of the given spatial portion of the visual content provided by the given time-split video pane includes a looping playback of the given spatial portion of the visual content.

9. The system of claim 5, wherein the number of time-split video panes and the time-changes for the time-split video panes are defined by a user.

10. The system of claim 5, wherein the time-split video panes include vertical panes and/or horizontal panes.

11. The system of claim 5, wherein the time-split video panes include concentric panes.

12. The system of claim 5, wherein the video includes a time-lapse video, and the time-split video panes of the time-split video provide simultaneous time-lapse views of the different spatial portions of the visual content at different moments within the progress length.

13. A method for generating time-split videos, the method performed by a computing system including one or more processors, the method comprising:
   obtaining, by the computing system, video information defining a video, the video having a progress length, the video including visual content viewable as a function of progress through the progress length;
   obtaining, by the computing system, time-split pane information, the time-split pane information defining a number of time-split video panes to be included in a time-split video, individual time-split video panes covering a spatial portion of the visual content, wherein a first time-split video pane covers a first spatial portion of the visual content and a second time-split video pane covers a second spatial portion of the visual content different from the first spatial portion of the visual content;

obtaining, by the computing system, time-split change information, the time-split change information defining time-changes for the time-split video panes, the time-changes for the time-split video panes including a first time-change for the first time-split video pane and a second time-change for the second time-split video pane, wherein a given time-change for a given time-split video pane includes a time-delay for a given spatial portion of the visual content covered by the given time-split video pane; and generating, by the computing system, the time-split video from the video, the time-split video including the number of time-split video panes, the time-split video panes of the time-split video providing simultaneous views of different spatial portions of the visual content at different moments within the progress length based on the time-changes for the time-split video panes, the first time-split video pane and the second time-split video pane of the time-split video providing simultaneous views of the first spatial portion of the visual content and the second spatial portion of the visual content at different moments within the progress length based on the first time-change for the first time-split video pane and the second time-change for the second time-split video pane.

14. The method of claim 13, wherein prior to the passage of the time-delay, the given time-split video pane provides a frozen view of the given spatial portion of the visual content.

15. The method of claim 13, wherein prior to the passage of the time-delay, the given time-split video pane provides a dynamic repeating view of the given spatial portion of the visual content.

16. The method of claim 13, wherein a given view of the given spatial portion of the visual content provided by the given time-split video pane includes a looping playback of the given spatial portion of the visual content.

17. The method of claim 13, wherein the number of time-split video panes and the time-changes for the time-split video panes are defined by a user.

18. The method of claim 13, wherein the time-split video panes include vertical panes and/or horizontal panes.

19. The method of claim 13, wherein the time-split video panes include concentric panes.

20. The method of claim 13, wherein the video includes a time-lapse video, and the time-split video panes of the time-split video provide simultaneous time-lapse views of the different spatial portions of the visual content at different moments within the progress length.

* * * * *